United States Patent [19]

Hager et al.

[11] Patent Number: 5,182,784
[45] Date of Patent: Jan. 26, 1993

[54] OPTICAL FIBER OR FILAMENT REINFORCEMENT COATING

[75] Inventors: Thomas P. Hager, Westerville; Janet A. Hendry, Newark, both of Ohio

[73] Assignee: Owens-Corning Fiberglas Technology, Inc., Summit, Ill.

[21] Appl. No.: 732,526

[22] Filed: Jul. 19, 1991

[51] Int. Cl.$^5$ .............. G02B 6/02; B05D 5/06; D02G 3/00; G03G 15/00

[52] U.S. Cl. .............. 385/128; 385/102; 385/123; 385/127; 385/141; 427/163; 427/416; 427/407.1; 428/364; 428/378; 430/56

[58] Field of Search .............. 385/123, 102, 127, 115, 385/128, 141, 143, 145; 427/162, 163, 164, 165, 204, 384, 385.5, 386, 387, 388.4, 389.7, 407.1, 407.2, 410, 416; 428/364, 378, 387, 394, 395; 430/56

[56] References Cited

U.S. PATENT DOCUMENTS

| | | | |
|---|---|---|---|
| 4,303,696 | 12/1981 | Brack | 427/44 |
| 4,467,071 | 8/1984 | Dawdy | 525/112 |
| 4,514,037 | 4/1985 | Bishop et al. | 385/128 |
| 4,522,465 | 6/1985 | Bishop et al. | 385/128 |
| 4,707,076 | 11/1987 | Skutnik et al. | 385/128 |
| 4,854,666 | 8/1989 | Kohara et al. | 385/128 |
| 4,875,758 | 10/1989 | Masuda et al. | 385/127 |
| 4,877,306 | 10/1989 | Kar | 385/128 |
| 4,904,051 | 2/1990 | Broer et al. | 385/128 X |
| 4,962,996 | 10/1990 | Cuellar et al. | 385/128 |
| 4,997,260 | 3/1991 | Honjo et al. | 385/128 |
| 5,058,987 | 10/1991 | Hosoya | 385/128 |

*Primary Examiner*—Brian Healy
*Attorney, Agent, or Firm*—Patrick P. Pacella; Ted C. Gillespie

[57] ABSTRACT

An aqueous coating composition for fibers comprising, a thermoplastic polyurethane latex, and acrylic latex, the balance being water. The coating also contains a paraffin wax or a second acrylic latex. When coated onto a bundle or strand of glass fibers the coated glass fibers are useful in optical fibers and cables. This coating is especially useful in reducing water wicking into the coated glass strand.

21 Claims, No Drawings

OPTICAL FIBER OR FILAMENT REINFORCEMENT COATING

Such coated fibers are useful in overcoating or wrapping fibers or cables such as, for example, optical cables. Typically, glass fibers are used as an overwrap on a cable or fiber and a thermoplastic resin is solidified on the glass fiber typically by an extruded overcoat One particular problem exists with overwrap fibers. Reinforcing yarns that wick water allow water to enter an optical cable if the cable's protective jacket was ever cut or otherwise breached. Water so entering could damage the optical fibers by directly corroding the fibers or by mechanically crushing them during freeze expansion at subfreezing temperatures.

The present invention provides a slurry or coating composition for coating glass fibers useful as an overwrap or coating on cables or fibers. We developed the present impregnate to reduce or eliminate water wicking into the coated glass strand.

SUMMARY OF THE INVENTION

The present invention provides an aqueous coating composition useful for glass strands which comprises a thermoplastic polyurethane latex and an acrylic latex. The composition also includes a paraffin wax emulsion or a second curable acrylic latex.

The aqueous coating or impregnant composition consists essentially of, on a weight percent basis:

|  | Weight Percent |
| --- | --- |
| thermoplastic polyurethane latex | 2–50 |
| a first curable acrylic latex | 3–55 |
| a paraffin wax emulsion or a second curable acrylic latex | 0.5–10 |
| water | balance |

The aqueous composition has a final solids content ranging from 1 to 60 weight percent.

DETAILED DESCRIPTION OF THE INVENTION

The present invention is employable with any glass fiber conventionally utilized for the reinforcement of polymeric resins. The term "glass fibers" as used herein shall mean filaments formed by attenuation of one or more streams of molten glass and to strands formed when such glass fiber filaments are gathered together in forming. The therm shall also mean yarns and cords formed by applying and/or twisting a multiplicity of strands together and to woven and non-woven fabrics which are formed of such glass fiber strands, yarns, or cords. Preferably, the coating formulation of the present invention is usable with conventionally available fibers.

The glass fibers used as input to an on-line or off-line process can be sized with any conventionally known sizing composition, which is well known to those skilled in the art. The individual components utilized in the practice of this invention are commercially available and can thus be simply blended with one another in the preparation of the formulations embodying the features of the present invention.

More preferably, the invention comprises an aqueous coating composition comprising, on a weight percent basis:

|  | Weight Percent |
| --- | --- |
| thermoplastic polyurethane latex | 4–40 |
| a first curable acrylic latex | 5–53 |
| a paraffin wax emulsion or a second curable acrylic latex | 0.6–7 |
| water | balance |

The aqueous composition has a final solids content ranging from 1 to 52 weight percent.

In the preferred embodiment of this invention. The aqueous coating or impregnant composition consists essentially of, on a weight percent basis:

|  | Weight Percent |
| --- | --- |
| thermoplastic polyurethane latex | 20–35 |
| a first curable acrylic latex | 25–45 |
| a paraffin wax emulsion or a second curable acrylic latex | 3–5 |
| water | balance |

The aqueous composition has a final solids content ranging from 20 to 40 weight percent.

Particularly suitable aqueous emulsions of polyurethane polymers are designated "Rucothane ®" lattices designated as 2010L, 2020L, 2030L, 2040L, 2050L, and 2060L. These materials are available from the Ruco Division of Hooker Chemical Corporation, N.Y. These materials are thermoplastic urethane lattices having varying particle size of a high molecular weight aliphatic isocyanate based thermoplastic elastomer in a water dispersion. The Rucothane lattices are based on aliphatic components and have polymer solids content in stable emulsions ranging from 55–65% by weight. The Rucothane lattices have a Brookfield viscosity RVF4 in centipoise at 2 RPM ranging from 7,000 for about 2060L and 2030L lattices up to 25,000 for the 2020L latex. Another nonexclusive example of a polyurethane polymer that can be prepared is one that is formed from the aliphatic or alicyclic isocyanate available from E.I. DuPont de Nemours and Co. under the trade designation "Hylene W".

The curable acrylic latexes we use include various acrylates, which are esters of acrylic or methacrylic acid, like methyl methacrylate, methyl acrylate, ethyl methacrylate, 2-ethylhexyl acrylate, butylacrylate and the like. The acrylic latexes also include dimethyl acrylamide, N-vinyl pyrrolidone, isobornyl acrylate, acrylic acid and dicclopentenyl acrylate, as well as 2-hydroxeyethyl acrylate, 2-hydroxpropyl acrylate and 2-hydroxyethyl acrylate.

The paraffin wax emulsions we use include aqueous soluble, emulsifiable or dispersible wax. The wax may be any suitable wax selected from the group consisting of vegetable waxes, such as carnauba, Japan, bayberry, candelilla, and the like; animal waxes such as beeswax, Chinese wax, hydrogenated sperm oil wax and the like; mineral waxes such as ozocerite, montan, ceresin and the like; and synthetic waxes such as polyalkylenes like polyethylenes, polyethylene glycols, polyethylene esters, chloronaphthalenes, sorbitals; polychlorotrifluoroethylenes; petroleum waxes such as paraffin, microcrystalline waxes and the like. The waxes are preferably those having a high degree of crystallinity and obtained from a paraffinic source, and most preferably are microcrystalline waxes. The microcrystalline waxes usually are branched chain paraffins having a crystal structure much smaller than that of normal wax and also a much higher viscosity and they are obtained by dewaxing tank bottom, refinery residues and other petroleum waste products.

The aqueous coating composition can be applied to continuous strand glass fibers in conventional off-line or in-line processes. In the in-line process the coating is applied as a sizing in the fiber forming operation. In the off-line process a bundle of input strands of glass fibers are pulled through an impregnation bath comprising the aqueous coating composition. The excess coating composition is removed by a stripper die. The resulting wet impregnated or coated bundle is dried in a conventional manner. The coated glass strands may be dried at elevated temperatures in an oven by any of the processes known to those skilled in the art to remove a substantial amount of the water. They may also be dried using a dielectric oven.

In one process a package is formed by taking up the dry or nearly dry strand on a winder. The package typically has a 5-20 percent by weight residual moisture. Further moisture is then removed by oven drying the package.

The coated glass fiber is especially useful as an overwrap on any type of cable, or on a fiber optic cable. It is also within the contemplated scope of the present invention that the coated glass fiber can be used in any of a number of reinforcement products. The coated glass fiber is overwrapped on a cable or fiber in a manner known to those skilled in the art.

A glass fiber coated with the aqueous coating composition of the present invention is superior to the conventionally coated or otherwise sized fibers currently available since the coated glass fibers have a desirably higher loading content of thermoplastic resin powder. The glass strand, as coated, is flexible, and is as easily processed as conventionally sized glass fibers.

It is also within the contemplated scope of the present invention that such overwrapped cable may have a secondary coating or be further coated with an extrusion of some type of thermoplastic resin such that the thermoplastic resin on the glass fibers not only fuses together with itself, but also is totally bound with the secondary thermoplastic coat. This then provides coated glass fiber which behaves both as a tension member and as a compression member.

EXAMPLE 1

An inventive coating composition prepared from the following ingredients:

| Ingredients | Weight Percent | |
|---|---|---|
| | Mix 1 | Mix 2 |
| Rucothane 2010L | 23% | 31% |
| Velvitol 77-70 | 4% | 5% |
| Rhoplex E-32 | 31% | 41% |
| Water | 42% | 23% |
| Percent Mix solids | 30% | 40% |
| Percent Organic on the Strand (% LOI) | 10.5% | 15.3% |

| Trade Name | Manufacturer | Composition |
|---|---|---|
| Rucothane 2010L | Ruco Polymer Corp. | Polyurethane Latex (emulsion polymerization) |
| Velvitol 77-70 | Alkaril Chemical Inc. | Paraffin Wax Emulsion |
| Rhoplex E-32 | Rohm and Haas Co. | Acrylic Latex |

After the strand was coated and properly cured, 24 inch lengths were cut from packages at random, suspended above a mixture of water, Pyranine (Mobay Chemical), and Methylene Blue indicator dye such that just the end of the strand was submerged in the water.

The rise of the water into the strand was measured with a ruler under ultraviolet light at various time intervals. We plotted the raw data in "inches wicked" versus "time in minutes". The "200 min" mark is actually in excess of 24-48 hours of wicking. The wicking was reduced from about 4.5 inches to an average of 0.77 inches at long wick times. This compares to the purchased competitive product, which wicked from about an inch to over 3.5 inches (depending on where the sample was taken from in the package) for an average of about 1.53 inches wicked at long exposure times in the dye bath. The new impregnant greatly reduces the height to which water will wick into the strand.

While the invention has been described in detail and with reference to specific embodiment thereof, it will be apparent to one skilled in the art that various changes and modification can be made therein without departing from the spirit and scope thereof.

We claim:

1. An aqueous coating and impregnant composition consisting essentially of, on a weight percent basis:

| | Weight Percent |
|---|---|
| thermoplastic polyurethane latex | 2-50 |
| a first curable acrylic latex | 3-55 |
| a third ingredient wherein the third ingredient is a paraffin wax emulsion or a second curable acrylic latex the second acrylic latex being different from the first acrylic-latex | 0.5-10 |
| water | balance | the aqueous composition having a final solids content ranging from 1 to 60 weight percent.

2. The aqueous composition of claim 1 being composed of the polyurethane latex, the first acrylic latex and the paraffin wax emulsion.

3. A plurality of flexible filaments at least a portion of the filament's surface being coated with a residue produced by evaporating water from an aqueous coating composition consisting essentially of, on a weight percent basis:

| | Weight Percent |
|---|---|
| thermoplastic polyurethane latex | 2-50 |
| a first curable acrylic latex | 3-55 |
| a third ingredient wherein the third ingredient is a paraffin wax emulsion or a second curable acrylic latex the second acrylic latex being different from the first acrylic latex | 0.5-10 |
| water | balance | the aqueous composition having a final solids content ranging from 1 to 60 weight percent.

4. A filament according to claim 3 wherein the filament is made of glass.

5. An optical fiber comprising a layer of reinforcing material substantially covering an optical fiber, the reinforcing material comprises continuous filaments coated with a residue produced by evaporating water from an aqueous coating composition of consisting essentially of, on a weight percent basis:

| | Weight Percent |
|---|---|
| thermoplastic polyurethane latex | 2–50 |
| a first curable acrylic latex | 3–55 |
| a third ingredient wherein the third ingredient is a paraffin wax emulsion or a second curable acrylic latex the second acrylic latex being different from the first acrylic latex | 0.5–10 |
| water | balance | the aqueous composition having a final solids content ranging from 1 to 60 weight percent.

6. An aqueous coating and impregnant composition consisting essentially of, on a weight percent basis:

| | Weight Percent |
|---|---|
| thermoplastic polyurethane latex | 4–40 |
| first curable acrylic latex | 5–53 |
| a third ingredient wherein the third ingredient is a paraffin wax emulsion or a second curable acrylic latex the second acrylic latex being different from the first acrylic latex | 0.6–7 |
| water | balance | the aqueous composition having a final solids content ranging from 1 to 52 weight percent.

7. The aqueous composition of claim 6 being composed of the polyurethane latex, the first acrylic latex and the paraffin wax emulsion.

8. A plurality of flexible filaments at least a portion of the filament's surface being coated with a residue produced by evaporating water from an aqueous coating composition consisting essentially of, on a weight percent basis:

| | Weight Percent |
|---|---|
| thermoplastic polyurethane latex | 4–40 |
| a first curable acrylic latex | 5–53 |
| a third ingredient wherein the third ingredient is a paraffin wax emulsion or a second curable acrylic latex the second acrylic latex being different from the first acrylic latex | 0.6–7 |
| water | balance | the aqueous composition having a final solids content ranging from 1 to 52 weight percent.

9. A filament according to claim 8 wherein the filament is made of glass.

10. An optical fiber comprising a layer of reinforcing material substantially covering an optical fiber, the reinforcing material comprises continuous filaments coated with a residue produced by evaporating water from an aqueous coating composition of consisting essentially of, on a weight percent basis:

| | Weight Percent |
|---|---|
| thermoplastic polyurethane latex | 4–40 |
| a first curable acrylic latex | 5–53 |
| a third ingredient wherein the third ingredient is a paraffin wax emulsion or a second curable acrylic latex the second acrylic latex being different from the first acrylic latex | 0.6–7 |
| water | balance | the aqueous composition having a final solids content ranging from 1 to 52 weight percent.

11. An aqueous coating and impregnant composition consisting essentially of, on a weight percent basis:

| | Weight Percent |
|---|---|
| thermoplastic polyurethane latex | 20–35 |
| a first curable acrylic latex | 25–45 |
| a third ingredient wherein the third ingredient is a paraffin wax emulsion or a second curable acrylic latex the second acrylic latex being different from the first acrylic latex | 3–5 |
| water | balance | the aqueous composition having a final solids content ranging from 20 to 40 weight percent.

12. The aqueous composition of claim 11 being composed of the polyurethane latex, the first acrylic latex and the paraffin wax emulsion.

13. A plurality of flexible filaments at least a portion of the filament's surface being coated with a residue produced by evaporating water from an aqueous coating composition consisting essentially of, on a weight percent basis:

| | Weight Percent |
|---|---|
| thermoplastic polyurethane latex | 20–35 |
| a first curable acrylic latex | 25–45 |
| a third ingredient wherein the third ingredient is a paraffin wax emulsion or a second curable acrylic latex the second acrylic latex being different from the first acrylic latex | 3–5 |
| water | balance | the aqueous composition having a final solids content ranging from 20 to 40 weight percent.

14. A filament according to claim 13 wherein the filament is made of glass.

15. An optical fiber comprising a layer of reinforcing material substantially covering an optical fiber, the reinforcing material comprises continuous filaments coated with a residue produced by evaporating water from an aqueous coating composition of consisting essentially of, on a weight percent basis:

| | Weight Percent |
|---|---|
| thermoplastic polyurethane latex | 20–35 |
| a first curable acrylic latex | 25–45 |
| a third ingredient wherein the third ingredient is a paraffin wax emulsion or a second curable acrylic latex the second acrylic latex being different from the first acrylic latex | 3–5 |
| water | balance | the aqueous composition having a final solids content ranging from 20 to 40 weight percent.

16. An aqueous coating and impregnant composition consisting essentially of, on a weight percent basis:

| | Weight Percent |
|---|---|
| thermoplastic polyurethane latex | 23 |
| a first curable acrylic latex | 31 |
| a third ingredient wherein the third ingredient is a paraffin wax emulsion or a second curable acrylic latex the second acrylic latex being different from the first acrylic latex | 4 |
| water | 42 | the aqueous composition having a final solids content of 30 weight percent.

17. An aqueous coating and impregnant composition consisting essentially of, on a weight percent basis:

| | Weight Percent |
|---|---|
| thermoplastic polyurethane latex | 31 |
| a first curable acrylic latex | 41 |
| a third ingredient wherein the third ingredient is a paraffin wax emulsion or a second curable acrylic latex the second acrylic latex being different from the first acrylic latex | 5 |
| water | 23 | the aqueous composition having a final solids content of 40 weight percent.

18. A plurality of flexible filaments at least a portion of the filament's surface being coated with a residue produced by evaporating water from an aqueous coating composition consisting essentially of, on a weight percent basis:

| | Weight Percent |
|---|---|
| thermoplastic polyurethane latex | 23 |
| a first curable acrylic latex | 31 |
| a third ingredient wherein the third ingredient is a paraffin wax emulsion or a second curable acrylic latex the second acrylic latex being different from the first acrylic latex | 4 |
| water | 42 | the aqueous composition having a final solids content of 30 weight percent.

19. A filament according to claim 18 wherein the filament is made of glass.

20. An optical fiber comprising a layer of reinforcing material substantially covering an optical fiber, the reinforcing material comprises continuous filaments coated with a residue produced by evaporating water from an aqueous coating composition of consisting essentially of, on a weight percent basis:

| | Weight Percent |
|---|---|
| thermoplastic polyurethane latex | 23 |
| a first curable acrylic latex | 31 |
| a third ingredient wherein the third ingredient is a paraffin wax emulsion or a second curable acrylic latex the second acrylic latex being different from the first acrylic latex | 4 |
| water | 42 | the aqueous composition having a final solids content of 30 weight percent.

21. An optical fiber comprising a layer of reinforcing material substantially covering an optical fiber, the reinforcing material comprises continuous filaments coated with a residue produced by evaporating water from an aqueous coating composition of consisting essentially of, on a weight percent basis:

| | Weight Percent |
|---|---|
| thermoplastic polyurethane latex | 31 |
| a first curable acrylic latex | 41 |
| a third ingredient wherein the third ingredient is a paraffin wax emulsion or a second curable acrylic latex the second acrylic latex being different from the first acrylic latex | 5 |
| water | 23 | the aqueous composition having a final solids content of 40 weight percent.

* * * * *